United States Patent

Yamano et al.

[11] Patent Number: 5,681,087
[45] Date of Patent: Oct. 28, 1997

[54] HEADREST

[75] Inventors: Eiichi Yamano, Ayase; Tohru Satoh, Yamato, both of Japan

[73] Assignee: Ikeda Bussan Co., Ltd., Ayase, Japan

[21] Appl. No.: 755,313

[22] Filed: Nov. 22, 1996

[30] Foreign Application Priority Data

Dec. 4, 1995 [JP] Japan .................. 7-337662

[51] Int. Cl.$^6$ .................. B60N 2/48
[52] U.S. Cl. .................. 297/391; 264/46.7
[58] Field of Search .................. 297/391, 408, 297/410, 452.18, DIG. 1; 264/46.7

[56] References Cited

U.S. PATENT DOCUMENTS

| 3,508,788 | 4/1970 | Barlow, Jr. et al. | 297/391 |
| 5,478,136 | 12/1995 | Takeuchi et al. | 297/391 |
| 5,611,977 | 3/1997 | Takei | 297/46.7 |

FOREIGN PATENT DOCUMENTS 60-142885  7/1985  Japan .................. 297/391

*Primary Examiner*—Peter R. Brown
*Attorney, Agent, or Firm*—Foley & Lardner

[57] ABSTRACT

A headrest to be installed to a seat back of an automotive seat. The headrest comprises a generally bag-shaped outer skin including a surface section which has first and second end edge portions. The first end edge portion includes a first part integral with the surface section, and a second part integral with the first part and generally parallel with the surface section. A slit is defined between the first part of the first end edge portion and the second end edge portion. The headrest is produced by a process including the following steps: (a) bending the first end edge portion inward of the surface section so that the second part of the first end edge portion is generally parallel with the surface section; (b) forming first insertion holes in the second part of the first end edge portion and second insertion holes in the surface section; (b) inserting headrest stays of a frame inside the bag-shaped outer skin through the slit formed; (d) inserting each headrest stay into each first insertion hole and each second insertion hole so that the head rest stay is projected out of the surface section; (e) disposing the bag-shaped outer skin inside a foaming-fabrication mold; and (f) pouring a raw material of a foam material through the slit into the bag-shaped outer skin so that the second end edge portion is brought into contact with the first part of the first end edge portion so as to tightly close the slit.

3 Claims, 3 Drawing Sheets

HEADREST

BACKGROUND OF THE INVENTION

1. Field of the Invention

This invention relates to improvements in a headrest to be installed to a seat back for supporting the head of a vehicle occupant, and more particularly to such a headrest of the type wherein a pad material formed of a foam material is stuffed within and integral with a bag-shaped outer skin.

2. Background of the Invention

Hitherto a variety of headrests of the above type have been proposed and put into practical use. A typical one of them is shown in FIGS. 5A, 5B and 5C illustrating a production process of the headrest. In this production process, first a headrest frame 2 is inserted inside the bag-shaped outer skin 1 through a laterally extending slit 5. The headrest frame 2 includes vertical rod sections (as headrest stays) 2a, 2a and a central rod section 2b for connecting the vertical rod sections at their lower ends so that the head rest frame 2 is formed generally U-shaped. The free end portions of the vertical rod sections 2a, 2a are projected out of a stay projecting section 1a of the bag-shaped outer skin 1. The laterally extending slit 5 is defined between laterally extending end edges 5a, 5a which are located face to each other and contactable to each other. The end edges 5a, 5a are formed upon being bent inwardly in order to prevent a raw material of a foam material from leaking out of the bag-shaped outer skin. In a condition where the headrest frame 2 is located in position as indicated in FIG. 5A, the bag-shaped outer skin 1 is disposed inside a foaming-fabrication mold (not shown), and then the raw material 3a of the foam material or pad material 3 is poured inside the bag-shaped outer skin 1 upon inserting a pouring head (not shown) through the slit 5. After the pouring head is got out of the slit 5, a foaming cure treatment is made on the raw material 3a as shown in FIG. 5A thereby obtaining the foamed pad material 3 which is formed integral with the inner surface of the outer skin 1.

However, drawbacks have been encountered in the above headrest produced in the above manner as discussed below. That is, the end edges 5a, 5a of the bag-shaped outer-skin 1 are low in rigidity and therefore there is the fear of the bending direction of the end edges 5a, 5a being unstable, although there is an advantage that no operation is required to close the slit with a special closing member or the like. More specifically, when the raw material 3a of the pad material 3 is foamed, the end edges 5a, 5a of the bag-shaped outer skin 1 will take their states shown in FIGS. 5B and 5C. In FIG. 5B, one of end edges 5a, 5a is partially bent up to be brought into contact with the stay projecting section 1a under the pressure due to foaming of the raw material 3a while the other end edge 5a is in the state of being vertically pendent. In FIG. 5C, one of the end edges 5a, 5a is partially bent up to be brought into contact with the stay projecting section 1a while the other end edge 5a is partially bent up to overlap with the end edge 5a. Under such a partial bent state of the end edges 5a, 5a, difference in foaming pressure to be applied the vicinity of the slit 5 is made thereby causing the slit to be meandering after the foaming-fabrication of the pad material 3. Additionally, there is the fear of inferior external appearance such as surface rise occurring at the surface near the slit 5.

SUMMARY OF THE INVENTION

It is an object of the present invention is to provide an improved headrest which can effectively overcome drawbacks encountered in conventional headrests.

Another object of the present invention is to provide an improved headrest which is high in quality and in external appearance because end edges (defining a slit) of a bag-shaped outer skin are effectively prevented from partially deforming or overlapping thereby preventing the slit from being meandering and the external appearance from being inferior owing to difference in foaming pressure to be applied to the inner surface of the bag-shaped outer skin at a portion near the slit.

A further object of the present invention is to provide an improved headrest which is high in rigidity of a bag-shaped outer skin at a portion near a slit defined by end edges of the outer skin thereby avoiding the fear of the raw material of a foam material leaking through the slit though the slit is formed in the bag-shaped outer skin for the bag-shaped outer skin.

A headrest according to the present invention comprises a generally bag-shaped outer skin including a surface section which has first and second end edge portions located inside the surface section. The first end edge portion includes a first part integral with the surface section, and a second part integral with the first part and generally parallel with the surface section. The first part of the first end edge portion is contactable with the second end edge portion to define a slit in the surface section, the second part of the first end edge portion being formed with a plurality of first insertion holes. The surface section is formed with a plurality of second insertion holes. A headrest frame includes headrest stays, each headrest stay being inserted into each first insertion hole and each second insertion hole to be projected outside the surface section. A foamed pad material is disposed inside and integral with the bag-shaped outer skin. The headrest is produced by a process including the following steps: (a) bending the first end edge portion inward of the surface section so that the first end edge portion has the first part and the second part generally parallel with the surface section; (b) forming the first insertion holes in the second part of the first end edge portion and the second insertion holes in the surface section; (b) inserting the headrest stays inside the bag-shaped outer skin through the slit formed in the surface section; (d) inserting each headrest stay into each first insertion hole and each second insertion hole so that the head rest stay is projected out of the surface section; (e) disposing the bag-shaped outer skin inside a foaming-fabrication mold; and (f) pouring a raw material of a foam material through the slit into the bag-shaped outer skin so that the second end edge portion is brought into contact with the first part of the first end edge portion so as to tightly close the slit.

According to the above headrest, one of the end edges of the bag-shaped outer skin is bent inward to take the generally L-shape so as to form the part generally parallel with the surface section of the bag-shaped outer skin. Each of the headrest stays is disposed passing through the generally parallel part and the surface section of the bag-shaped outer skin. In this state, the raw material of the foam material is poured through the slit of the bag-shaped outer skin so as to accomplish a foaming-fabrication of the pad material which is integral with the inner surface of the bag-shaped outer skin. During this foaming-fabrication, the other end edge of the bag-shaped outer skin is brought into tight contact with the L-shaped bent end edge under the pressure due to foaming of the pad material, so that the slit can be tightly closed while improving the rigidity of a portion around the slit thereby preventing the raw material of the foam material from leaking through the slit. This effectively prevents the end edges of the bag-shaped end edge portions from partially deforming or overlapping thus avoiding meandering

3 and inferior external appearance such as surface rise owing to difference in foaming pressure to be applied to the inner surface of the bag-shaped outer skin at a portion near the slit.

DETAILED DESCRIPTION OF THE INVENTION

Figure 1:
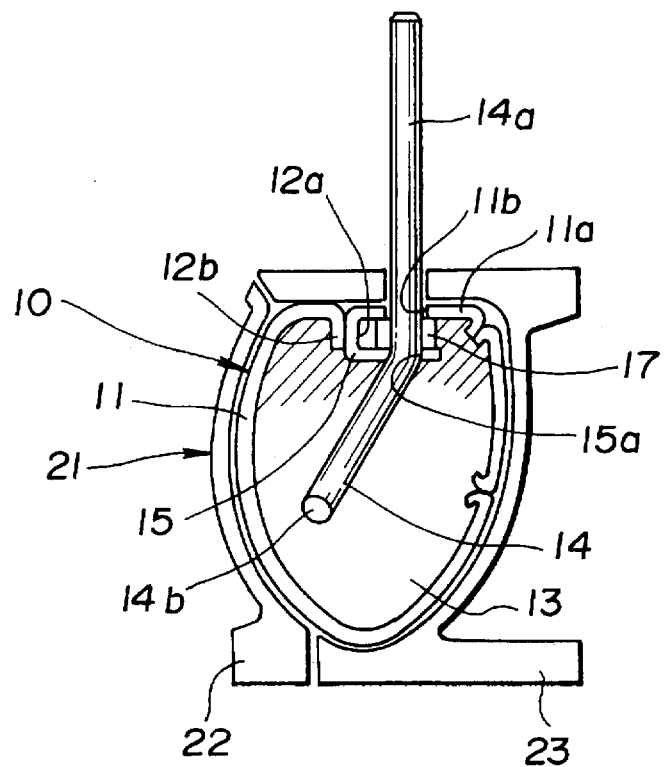
FIG. 1 is a vertical sectional view of an embodiment of a headrest according to the present invention, during production thereof.
Figure 2A:
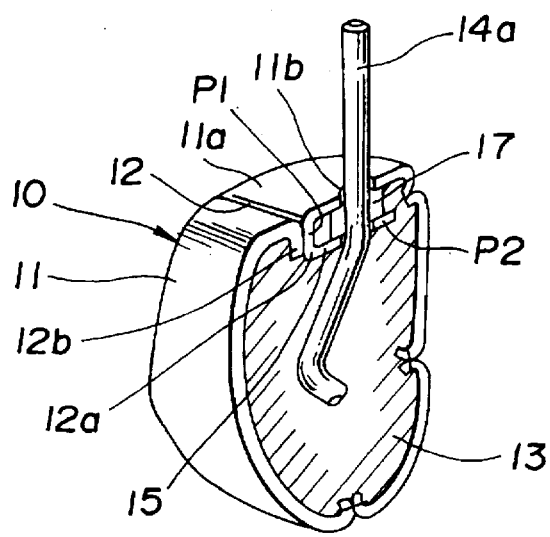
FIG. 2A is a fragmentary perspective view of the headrest of FIG. 1.
Figure 2B:
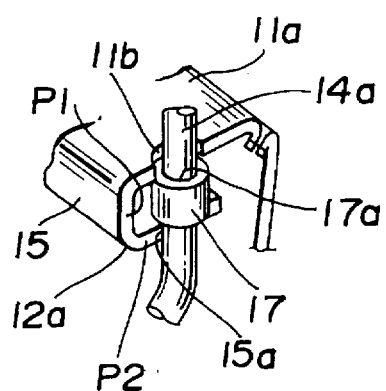
FIG. 2B is a fragmentary perspective view of an essential part of the headrest of FIG. 1.
Figure 3:
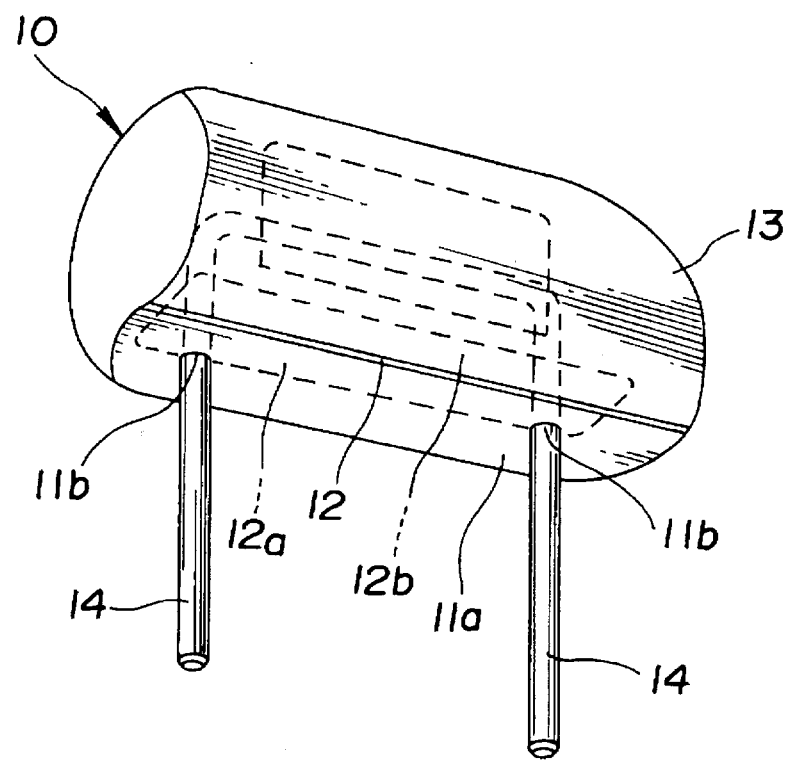
FIG. 3 is a perspective view of the headrest of FIG. 1, in an actually used condition.

Referring now to FIGS. 1 to 3 of the drawings, an embodiment of a headrest according to the present invention is illustrated by the reference numeral 10. The headrest 10 comprises an outer skin 11 which is generally bag-shaped and includes a stay projecting or surface section 11a which is positioned below when the headrest 10 is installed to a seat back (not shown) of an automotive vehicle. A headrest frame 14 is partly disposed within the outer skin 11 and includes two headrest stays 14a, 14a which vertically extend and parallel with each other, and a central rod section 14b which integrally connects the two headrest stays 14a, 14a, so that the head rest frame 14 is generally U-shaped. The stay projecting section 11a of the outer skin 11 is formed with a pair of insertion holes 11b, 11b through which the head rest stays 14a, 14a project respectively out of the outer skin 11.

The bag-shaped outer skin 11 is further formed with a laterally extending slit 12 which extends parallel with an imaginary vertical plane (not shown) containing the axes of the insertion holes 11b, 11b and reaches from the vicinity of one end to the vicinity of the other end of the bag-shaped outer skin 11. The laterally extending slit 12 is arranged such that a raw material of a pad material 13 is poured therethrough, and the frame 14 is inserted therethrough into the bag-shaped outer skin 11.

More specifically, the laterally extending slit 12 is formed between laterally extending end edge portions 12a, 12b which are located opposite to each other and normally in contact with each other. The end edge portion 12a includes a vertically extending part P1 which is integral with the stay projecting section 11a. A horizontally extending part P2 is integral with the part P1 and extends parallel with the stay projecting section 11a. Thus, the laterally extending end portion 12a forms a bent portion 15 which is generally L-shaped in section. The part P2 is formed with two insertion holes 15a, 15a which are located facing the insertion holes 11b, 11b formed in the stay projecting section 11a.

4

Thus, one of the insertion holes 11b, 11b and one of the insertion holes 15a, 15a are located respectively above and below so as to face each other so that the headrest stay 14a passes through both the insertion holes 11b, 15a. The other laterally extending end edge portion 12b is also vertical and parallel with the part P1 of the end portion 12a so as to be normally in contact with the part P1.

The headrest stays 14a, 14a of the frame 14 are inserted inside the bag-shaped outer skin 11 in the following manner: First, the free end sections of the head rest stays 14a, 14a are inserted through the slit 12a, and then projected out of the skin 11 passing through the stay projecting section 11a of the outer skin 11 in such a manner that the free end section of each headrest stay 14a is inserted into the insertion hole 15a of the part P2 of the end edge portion 12a and then into the insertion hole 11b of the stay projecting section 11a. Under this state, the central rod section 14b of the frame 14 is inserted through the slit 12 into the bag-shaped outer skin 11 and maintained inside the outer skin 11. It will be understood that the shape of the frame 14 is not limited to one which has been shown and described, and therefore the headrest stays 14a, 14a and the central rod section 14b may be separate from each other, in which the stays 14a, 14a and the rod section 14b are securely connected with each other to serve as a one-piece structure.

Figure 4:
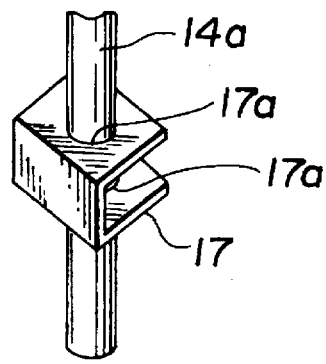
FIG. 4 is a fragmentary perspective view of an modified example of an essential part of the headrest of FIG. 1.
Figure 5A:
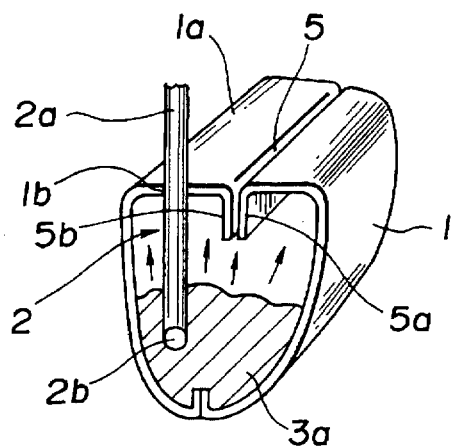
FIG. 5A is a fragmentary perspective view of a conventional headrest, showing a first state during production of the headrest.
Figure 5B:
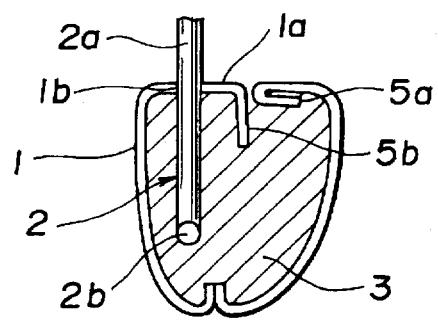
FIG. 5B is a vertical sectional view of the conventional headrest of FIG. 5A, shorting a second state during the production of the headrest.
Figure 5C:
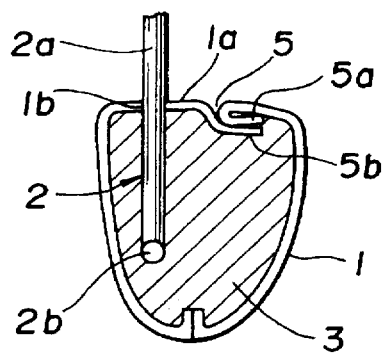
FIG. 5C is a vertical sectional view similar to FIG. 5B but showing a third state during the production of the conventional headrest.

A cylindrical spacer 17 is disposed between the stay projecting section 11a and the part P2 of the end edge portion 12a as shown in FIG. 2B in such a manner that the headrest stay 14a is disposed in the through-hole 17a of the cylindrical spacer 17. The spacer 17 functions to maintain a clearance between the stay projecting section 11a and the part P2 of the end portion 12a, and to locate the headrest stay 14a and the outer skin 11. It will be understood that the spacer 17 is not limited to the cylindrical one shown in FIG. 2B and therefore the spacer 17 may be generally C-shaped to maintain a distance in a vertical direction as shown in FIG. 4.

Next, production of the above headrest 10 will be discussed hereinafter.

First, the frame 14 is disposed inside the bag-shaped outer skin 11 as discussed above so as to be put into the state shown in FIG. 1. Then, the bag-shaped outer skin 11 provided with the frame 14 is put between left- and right-side split molds 22, 23 constituting a foaming-fabrication mold 21 which is in an open state, in which the headrest stays 14a, 14a are supported by the right-side split mold 23 as shown in FIG. 1. Under this condition, the laterally extending slit 12 is opened or widened in a direction perpendicular to the longitudinal direction of the slit 12. Then, a tip end section of a pouring head (not shown) for pouring the raw material (in liquid state) of a foam material 13 such as polyurethane foam is inserted inside the bag-shaped outer skin 11 upon pressing downward the side of the end edge portion 12b. The raw material of the foam material is poured inside the bag-shaped outer skin 11.

Thereafter, the pouring head is got out of the bag-shaped outer skin 11. At this time, the end edge portion 12b is brought into press contact with the vertical part P1 of the end portion 12a because the bent portion 15 (the end edge portion 12b) has a considerable rigidity, and therefore the laterally extending slit 12 is smoothly tightly closed. Then, the left-side split mold 22 is coupled with the right-side split mold 23 as shown in FIG. 1, upon which the raw material of the foam material is cured to obtain the foamed pad material 13 or the foam material under a condition where the end edge portions 12a, 12b defining the laterally extending slit 12 are tightly contacted with each other thereby preventing the raw material of the foam material from leaking through the slit 12. At this time, the end portion 12a has the considerable rigidity and therefore the pad material 13 is fabricated integral with the inner surface of the bag-shaped outer skin 11 in a condition where the laterally extending slit 12 is closed maintaining a linear state regardless of an internal pressure generated owing to foaming of the raw material of the pad material 13.

While the left- and right-side split molds 22, 23 have been shown and described, it will be understood that sprit molds 22, 23 may be replaced with lower and upper molds constituting the foaming-fabrication mold 2, in which the upper mold may be constituted of sprit molds.

What is claimed is:

1. A headrest comprising:

a generally bag-shaped outer skin including a surface section which has first and second end edge portions located inside said surface section, said first end edge portion including a first part integral with said surface section, and a second part integral with said first part and generally parallel with said surface section, said first part of said first end edge portion being contactable with said second end edge portion to define a slit in said surface section, said second part of said first end edge portion being formed with a plurality of first insertion holes, said surface section being formed with a plurality of second insertion holes;

a headrest frame including headrest stays, each headrest stay being inserted into each first insertion hole and each second insertion hole to be projected outside said surface section; and a foamed pad material disposed inside and integral with said bag-shaped outer skin;

said headrest being produced by a process including the following steps:

bending said first end edge portion inward of said surface section so that said first end edge portion has said first part and said second part generally parallel with said surface section;

forming said first insertion holes in said second part of said first end edge portion and said second insertion holes in said surface section;

inserting said headrest stays inside said bag-shaped outer skin through said slit formed in said surface section;

inserting each headrest stay into each first insertion hole and each second insertion hole so that the head rest stay is projected out of said surface section;

disposing said bag-shaped outer skin inside a foaming-fabrication mold; and pouring a raw material of a foam material through said slit into said bag-shaped outer skin so that said second end edge portion is brought into contact with said first part of said first end edge portion so as to tightly close said slit.

2. A headrest stay as claimed in claim 1, further comprising a spacer disposed between said surface section and said second part of said first end edge portion of said bag-shaped outer skin.

3. A headrest stay as claimed in claim 2, wherein said spacer is cylindrical and has a through-hole through which each headrest stay pierces.

* * * * *